United States Patent [19]

Koepke

[11] 4,037,714
[45] July 26, 1977

[54] RECIPROCATING CONVEYOR

[75] Inventor: Frederick W. Koepke, Livonia, Mich.

[73] Assignee: Centri-Spray Corporation, Livonia, Mich.

[21] Appl. No.: 707,427

[22] Filed: July 21, 1976

[51] Int. Cl.² ............................................... B65G 35/00
[52] U.S. Cl. .................................... 198/750; 198/772; 198/600
[58] Field of Search ............... 198/538, 594, 600, 721, 198/750, 772, 773, 774, 775, 776; 193/35 TE

[56] References Cited

U.S. PATENT DOCUMENTS

| | | | |
|---|---|---|---|
| 2,820,542 | 1/1958 | Oswald | 198/772 |
| 3,030,896 | 4/1962 | Umbricht et al. | 198/750 |
| 3,048,258 | 8/1962 | Skold | 198/772 |
| 3,139,171 | 6/1964 | Umbrict et al. | 198/774 |
| 3,355,008 | 11/1967 | Milazzo | 198/774 |
| 3,512,630 | 5/1970 | Greenfield | 198/772 |

FOREIGN PATENT DOCUMENTS

| | | | |
|---|---|---|---|
| 1,006,797 | 4/1957 | Germany | 193/35 TE |
| 616,895 | 1/1949 | United Kingdom | 193/35 TE |

Primary Examiner—Evon C. Blunk
Assistant Examiner—Richard K. Thomson
Attorney, Agent, or Firm—Joseph W. Farley

[57] ABSTRACT

A conveyor consisting of a transfer bar provided with article supporting rollers, a stationary frame supporting the transfer bar, and driving means for reciprocating the transfer bar on forwarding and return movements, anti-backup dogs being mounted on the frame to prevent return article movement. An expandable and contractable section is provided at each end of the transfer bar, each section including a number of article supports which are slidably mounted on the frame so that their longitudinal spacing can be increased by a chain connection to the transfer bar and can be decreased through engagement by the transfer bar. Each article support has an article carrying roller mounted at the level of the article supporting rollers of the transfer bar so that the combination of the transfer bar and the expandable and contractable sections provides a reciprocating conveyor of fixed length having a continuous support along which articles can be conveyed, stopped, accumulated and transferred to another conveyor, as desired.

10 Claims, 8 Drawing Figures

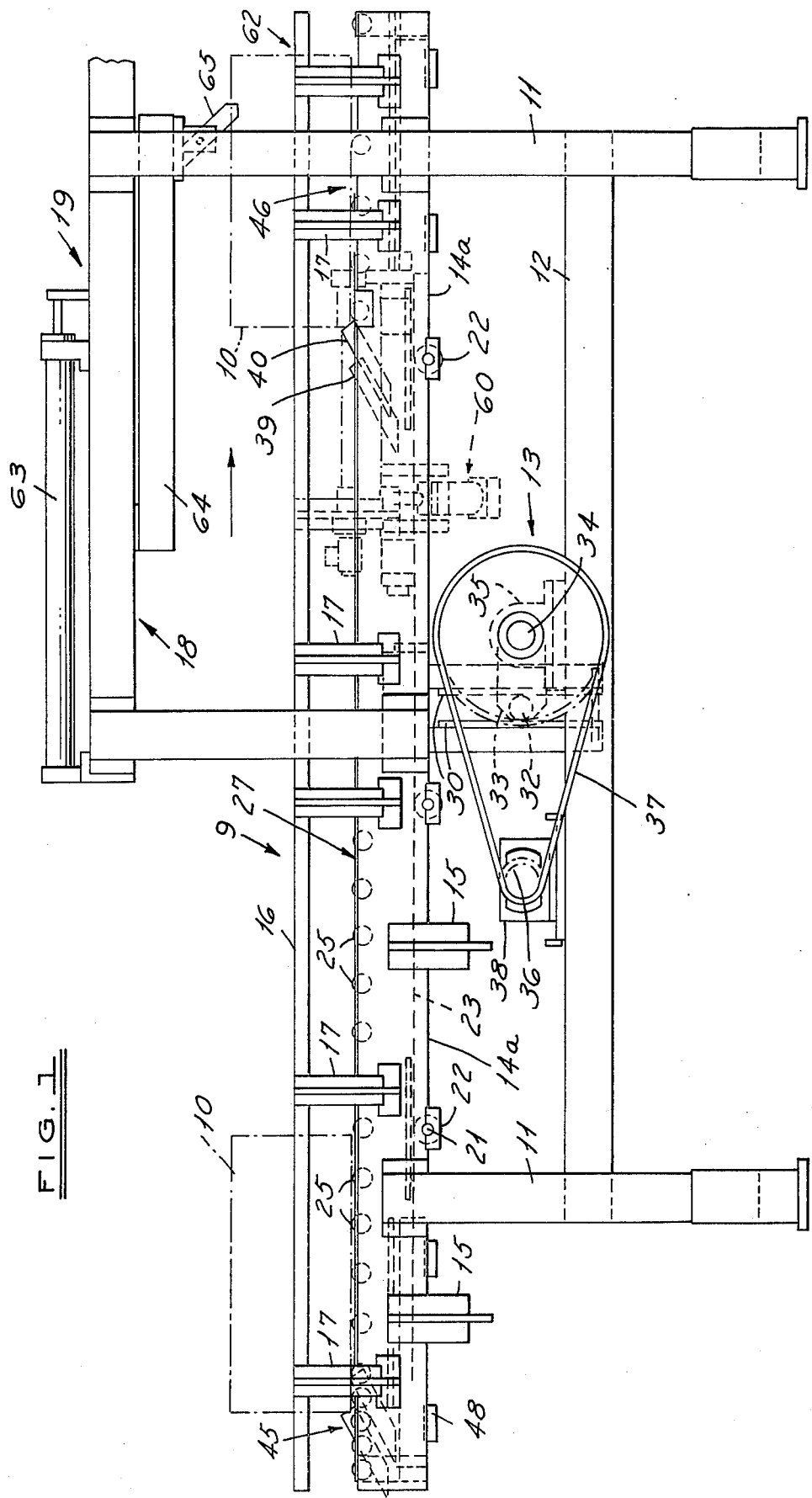

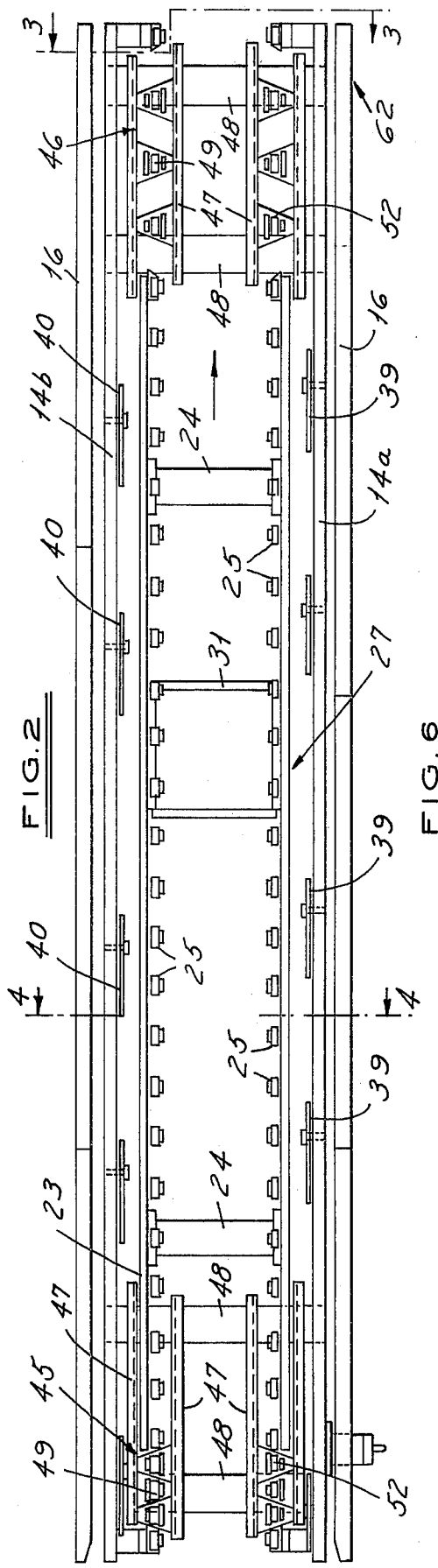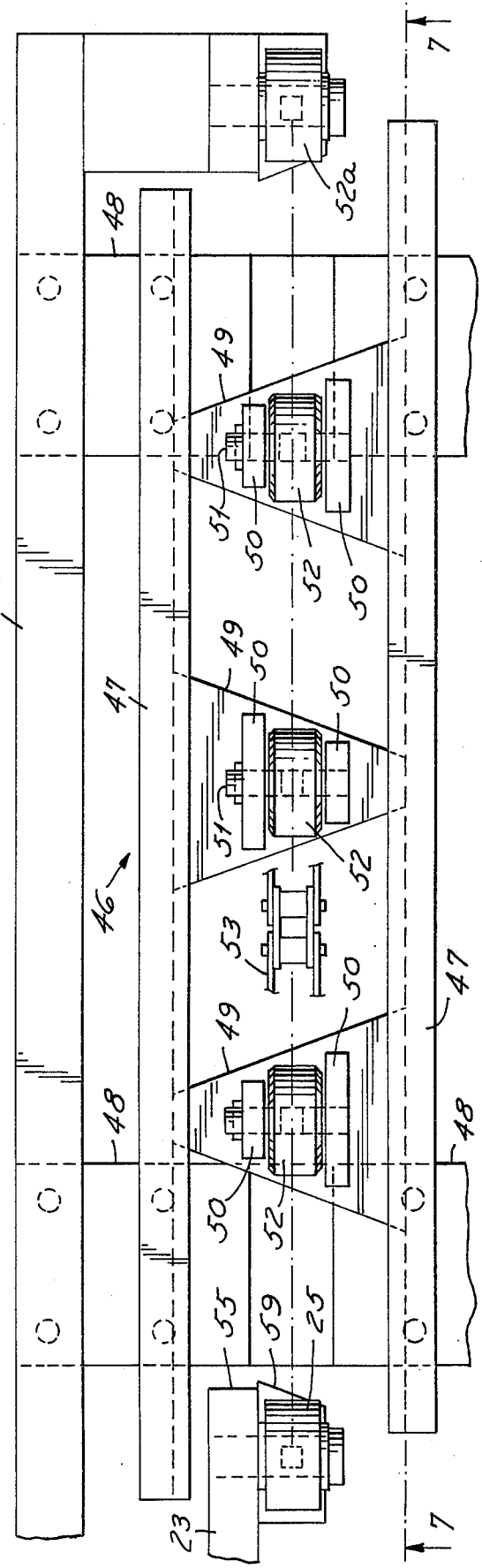

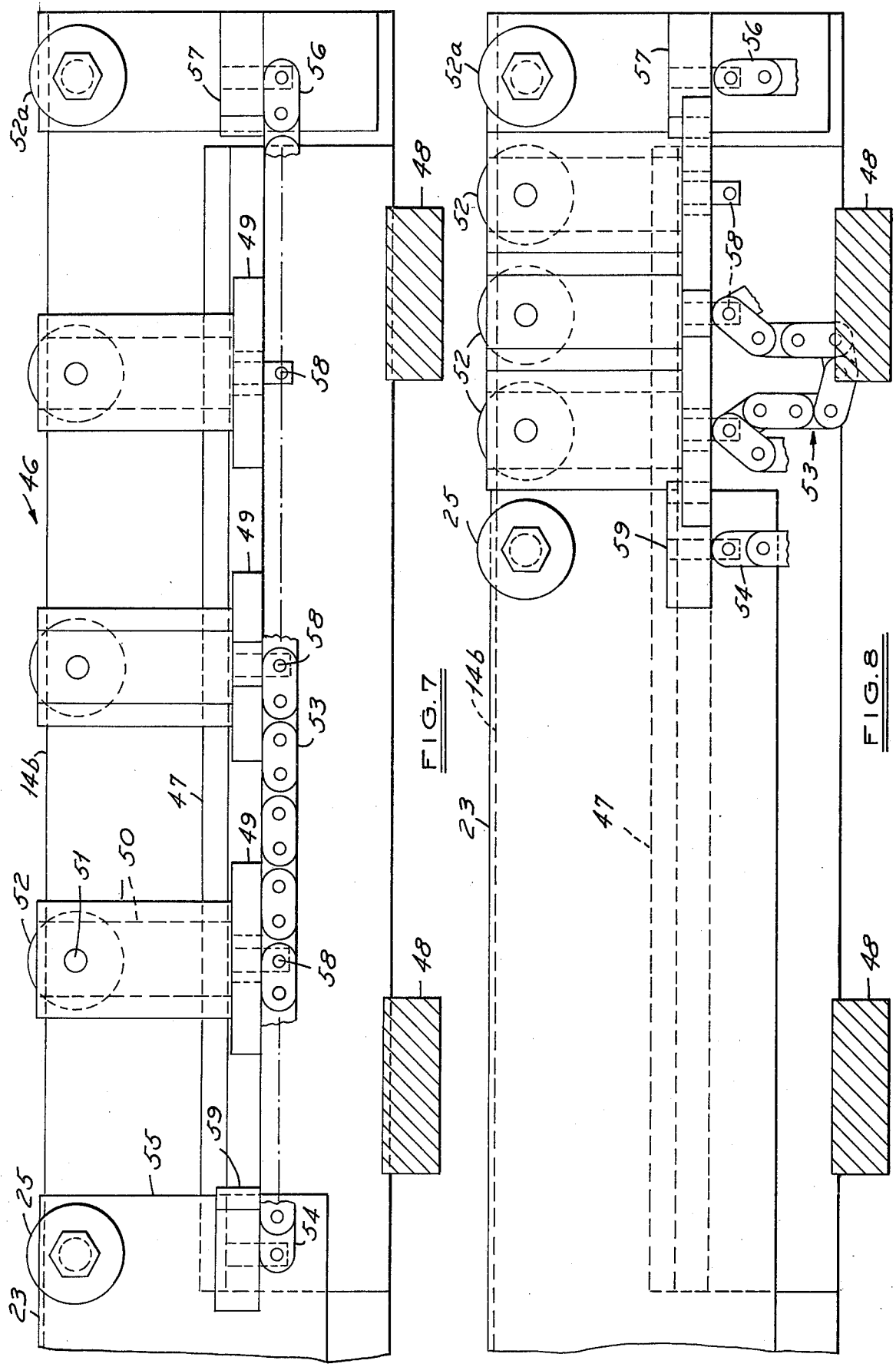

RECIPROCATING CONVEYOR

The present invention relates to improvements in a reciprocating roller conveyor of the type disclosed in U.S. Pat. No. 2,820,542, which consists of an article supporting roller bed or transfer bar mounted on a stationary frame and reciprocated on forward and return strokes. Inertia developed in the articles on the forward stroke of the roller bed, together with anit-backup dogs mounted on the stationary frame, prevent backward movement of the articles on the return stroke of the roller bed when the rollers thereof roll freely under the articles. While such a conveyor has the feature that articles can be readily stopped and accumulated along the roller bed, such a conveyor has limited application because space must be provided at each end of the conveyor to permit the reciprocating movements of the roller bed.

According to the present invention there is provided a conveyor having a frame, a transfer bar carried by the frame, the transfer bar having article supporting means thereon, and driving means for reciprocating the transfer bar on forward and return movements, wherein an expandable and contractable section is carried by the frame adjacent at least one end of the transfer bar, said section including a plurality of article supports relatively movable in the directions of forward and return movements of the transfer bar, said article supports forming a continuation of the article supporting means of the transfer bar, and means for relatively moving said article supports to vary the spacing therebetween in response to forward and return movements of the transfer bar.

Preferably, an expandable and contractable section is provided adjacent each end of the transfer bar, thereby forming a reciprocating conveyor of fixed length having continuous article support for any desired purpose such as operation of a work station, article accumulation, or continued article travel to a successive conveyor.

Preferably also, freely rotatable rollers are employed for both the article supporting means of transfer bar and the article supports of the expandable and contractable sections. During forward movement of the tranfer bar, these rollers carry the articles forward and roll under any stopped article or series of stopped (accumulated) articles. One-way dogs mounted on the conveyor frame prevent backward movement of the articles during return movement of the transfer bar, and the rollers roll under the articles. The rolling action of the rollers under stopped articles reduces wear and the power required to operate the conveyor.

Other features and advantages of the invention will appear from the description to follow of the embodiment shown in the accompanying drawings.

DESCRIPTION OF THE DRAWINGS

FIG. 1 is a side elevation of a typical conveyor constructed in accordance with the present invention.

FIG. 2 is a plan view of the conveyor of FIG. 1.

FIG. 6 is an enlarged fragmentary plan view of the roller end sections illustrated at the upper side and right end of FIG. 2, typical of both sides and both ends of the conveyor.

FIG. 7 is a sectional elevation taken along the line 7—7 of FIG. 6.

FIG. 8 is a view similar to FIG. 7 showing the roller section in contracted condition.

DESCRIPTION OF THE PREFERRED EMBODIMENT

Figure 3:
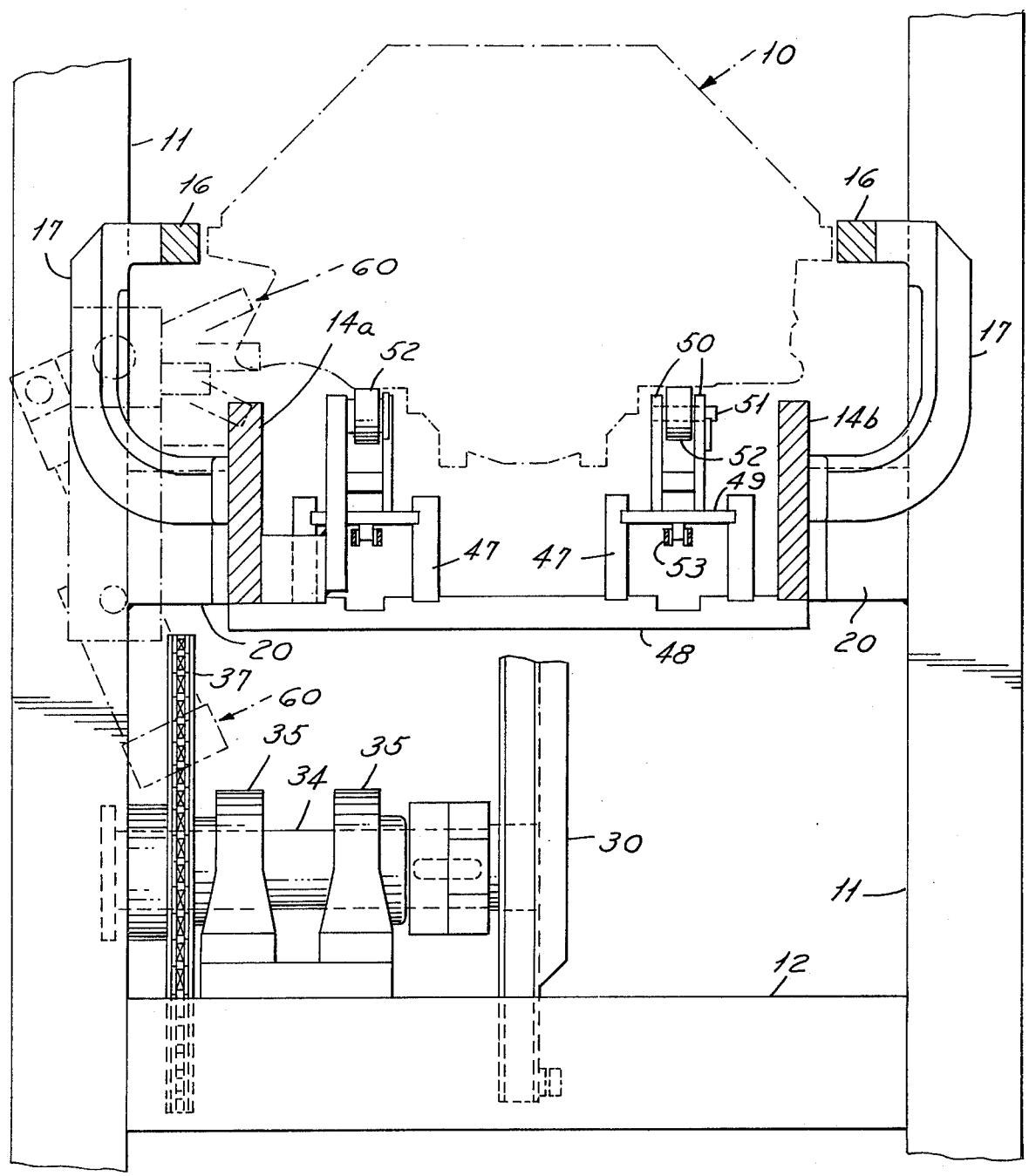
FIG. 3 is an enlarged sectional elevation taken along the line 3—3 of FIG. 2.

Referring to FIGS. 1-4, a conveyor section adapted to convey engine blocks 10 is illustrated, having a frame including pedestals 11, a mounting bed 12 for a drive assembly 13, side rails 14a and 14b connected by transverse channels 15, guide rails 16 mounted on side brackets 17 and a superstructure 18 for mounting an unloader apparatus 19.

Figure 4:
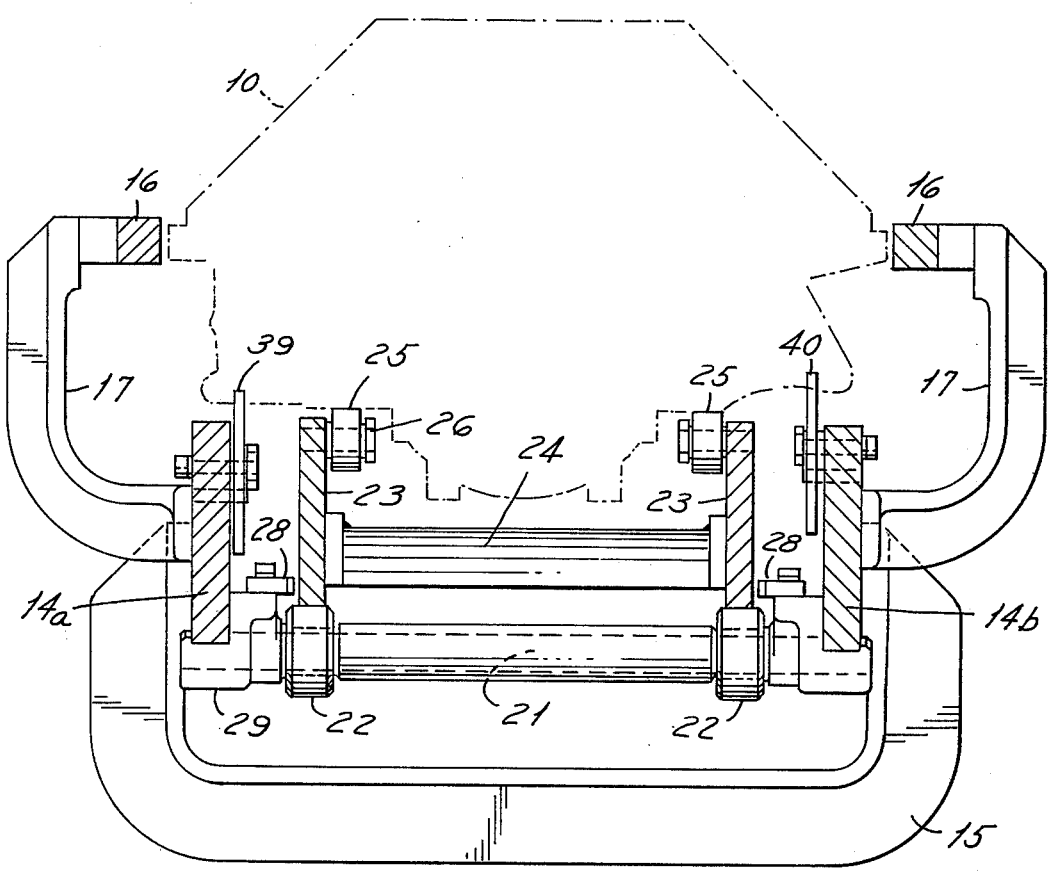
FIG. 4 is a typical cross section taken along the line 4—4 of FIG. 2.

The side rails 14a and 14b, as shown in FIG. 3, are attached to the pedestals 11 by suitable brackets 20; and as best shown in FIG. 4 the side rails 14 in turn carry transverse axles 21 and rollers 22 for supporting a transfer bar assembly 27 consisting of side members 23 joined by cross braces 24 and having article supporting means thereon in the form of a series of free rollers 25 mounted on bearing studs 26. This transfer bar assembly 27 is reciprocated, on the rollers 22 and between lateral guides 28 mounted on the axle supports 29, on forward and return movements by driving means acting through a pair of central depending roller track elements 30 rigidly secured to the side members 23 by a transverse mounting bracket 31 shown in FIG. 2. The roller tracks 30 are engaged by a drive roller 32 at the end of a crank arm 33 secured to drive shaft 34 mounted in journals 35, as best shown in FIGS. 1 and 3; and driven by a sprocket 36 and chain 37 from a suitable motor 38 which may provide continuous or intermittent motive power for acceleration and deceleration control. Continuous drive from the motor 38 will be seen to produce harmonic reciprocation of the transfer bar assembly 27 with an acceleration to maximum velocity of forward reciprocation, deceleration to 0, accelerated return to maximum velocity, and deceleration to 0 in four successive quadrant movements of the crank arm 33. By superimposing control variation in the speed of the motor 38 any desired reciprocation cycle may be provided, as further explained hereafter.

Figure 5:
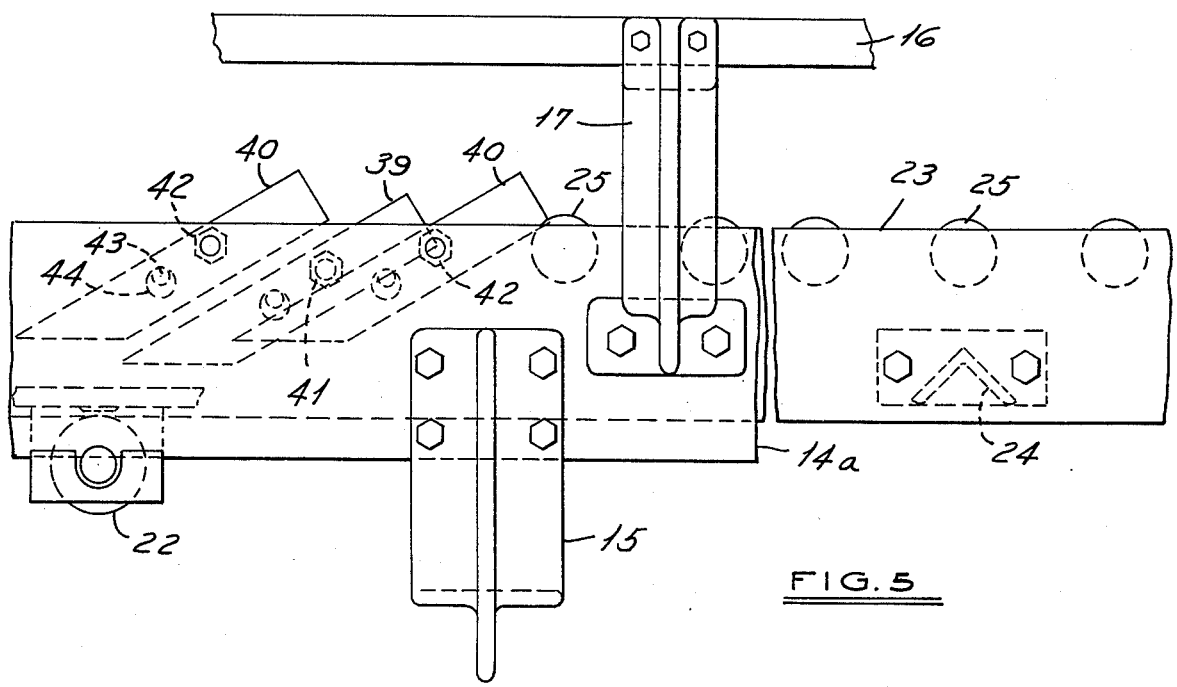
FIG. 5 is a frangmentary side elevation illustrating a mounting for hold-back dogs.

As best shown in FIGS. 4 and 5, forwardly inclined holdback dogs 39 and 40 are pivotally mounted at 41 and 42 near the top of the respective side rails 14a and 14b in longitudinally spaced relation, and in staggered relation and at different elevations if necessary to engage appropriate rear surfaces of an irregular article such as the engine block 10 herein illustrated. The dogs are depressed by forward travel of the article, and are gravity returned upon passing of the article, within the limits of lost motion permitted by fixed pins 43 engaging enlarged holes 44 in the dogs.

The longitudinal spacing of the hold-back dogs may be determined with relation to the length of the articles to be conveyed, such as at intervals slightly greater than the article length, but preferbly the longitudinally staggered spacing between the hold-back dogs is relatively close so that positive hold back action is provided along the length of the conveyor. The forward stroke of the transfer bar may also be designed with relation to the article length, and is preferably slightly greater than the article length in order to achieve deceleration of a forwarded article to substantially zero before that article can engage a preceding stopped article, and in order to assure a full length of article advancement during each cycle.

From the foregoing description it will be apparent that any series of articles, such as the engine blocks 10 illustrated, may be conveyed in sequential steps by reciprocation of the transfer bar with traction drive of the support rollers 25 propelling the articles forwadly through accelerating and decelerating cycles between the fixed guide rails 16 and by the hold back dogs assuring retention of the articles against backward movement during each return cycle of the transfer bar.

FIGS. 1-3, 6, 7 and 8 illustrate expandable and contractable roller sections 45 and 46 which are provided adjacent to the ends of the transfer bar 27 and which respectively form the loading and unloading ends of the conveyor. Each of the sections 45 and 46 consists of two pairs of fixed guide rails 47 mounted on cross braces 48, and each pair of guide rails slidably supports a series of trapezoidal base plates 49. Attached to each of the plates 49 is a pair of upright members 50 carrying a transverse axle 51 and an article support in the form of a roller 52 which has an elevation equal to that of the rollers 25 mounted on the transfer bar 27. The article supports 52 of each of the sections 45 and 46 are relatively movable in the directions of forward and return movements of the transfer bar 27 through sliding movement of the base plates 49 on the guide rails 47; and, the article supports 52, together with fixed supporting rollers 52a at the ends of the conveyor, form a continuation of the article supporting means of the transfer bar 27.

Means are provided for relatively moving the article supports 52 to vary the spacing therebetween, and in the construction shown this means comprises, for each series of slidably supported base plates 49, a chain 53 which is anchored at one end 54 to an end 55 of one side member 23 of the transfer bar 27 and at the other end 56 to a fixed attachment block 57 mounted at the end of one of the side rails 14a and 14b. Each chain 53 is also connected at intermediate points 58 to the base plates 49 of the series and provides the expanded spacing illustrated in FIG. 7 in response to movement of the transfer bar in one direction, the expanded spacing of the article supports 52 being approximately equal to the spacing of the rollers 25 on the transfer bar 27.

Movement of the transfer bar 27 in the opposite direction results in engagement between an abutment 59 on the end of each side member 23 and the adjacent base plate 49, and in the progressive engagement of successive base plates 49 until the article supports 52 reach the fully contracted position shown in FIG. 8.

As can be seen from FIGS. 1 and 2, which shown the transfer bar 27 at the end of a return stroke, the section 45 is then in fully contracted position with its base plates 49 in abutment with each other, while the section 46 is then fully expanded condition. When the transfer bar 27 reaches the end of its next forward stroke, the conditions of the sections 45 and 46 will be reversed. The combination of the transfer bar 27 and the sections 45 and 46, expandable and contractble in response to reciprocating movement of the transfer bar 27, results in full article support over the entire length of the conveyor for whatever stroke that is employed for the transfer bar, and further provides the advantages of forwarding and accumulating articles by traction roller drive over the entire length of the conveyor.

The conveyor 9 may be adapted to numerous end uses. For example, a work station may be located upstream from the discharge end 62 of the conveyor and be segregated from the remainder of the conveyor by a conventional escapement device 60 which meters articles 10 to the work station and which causes following articles to stop and accumulate upstream of the device 60 until the work station is clear. A conventional unloading mechanism including an actuating cylinder 63, slide 64 and transfer dog 65 may be provided at the discharge end 62 of the conveyor for feeding articles 10 to a following work station, unloading station or other equipment including a continuing conveyor station. One-way drive dogs, not shown but similar to the dogs 39 and 40, may be mounted on the discharge end of the transfer bar 27, or on selected article supports of the section 46, for the push-across transfer of articles to a continuing conveyor section. Thus the conveyor 9 is a highly versatile unit adaptable to production lines and other conveying systems.

In operation, the drive cycle will normally be timed to produce accelerating and decelerating forces within the tractive capacity of the rollers 25 and 52 in a non-rotating condition. Under this condition of static bearing load, the tractive capacity of the rollers will greatly exceed the friction involved in the roller bearings when the rollers are rotating, as during retraction of the transfer bar or advancement under accumulated articles. The transition from a relatively high static coefficient of friction to a relatively low rotating coefficient of friction is useful in minimizing the power required to drive the conveyor 9 as well as in protecting the articles and the conveyor against wear, marking or other damage.

In order to achieve a high rate of advancement along the conveyor 9, a relatively long reciprocating stroke is preferred since a higher average rate of advancement is possible than with an equivalent series of shorter strokes. This, as well as the desirability of decelerating the article for accumulation purposes will normally lead to a reciprocating stroke coordinated with the length of the article, which in the absence of expanding and contracting end roller sections would obviously lead to a gap requiring special handling provisions.

In order to further miximize the cycle speed of conveyance, provision may be made in the drive to achieve uniform acceleration and deceleration rather than the harmonic motion resulting under constant drive motor speed from the crank action illustrated. Also, by providing a variable speed input drive coordinated with the reciprocating cycle it is possible to achieve a relatively rapid return stroke of the transfer bar resulting in a shorter total cycle time.

While a constant roller level is preferred in conveying heavy articles such as the engine blocks illustrated, it is possible in certain applications of the system to combine with the expanding and contracting sections illustrated in the present application a walking beam type of transfer bar, raising the article slightly above the fixed support level during advancement and retracting the walking beam slightly below article support level during retraction, thereby dispensing with the need for anti-backup dogs.

I claim:

1. In a conveyor having a frame, a transfer bar carried by the frame, the transfer bar having article supporting means thereon, and driving means for reciprocating the transfer bar on forward and return movements.

the improvement comprising:
an expandable and contractable section carried by the frame adjacent at least one end of the transfer bar, said section including a plurality of article supports relatively movable in the directions of forward and return movements of the transfer bar, said article supports forming a continuation of the article supporting means of the transfer bar; and, means for relatively moving said article supports to vary the spacing therebetween in response to forward and return movements of the transfer bar.

2. A conveyor as set forth in claim 1 wherein said article supporting means on said transfer bar comprises a series of freely rotatable rollers.

3. A conveyor as set forth in claim 2 wherein said article supports of the expandable and contractable section are provided with freely rotatable article engageable rollers.

4. a conveyor as set forth in claim 3 further comprising hold-back means for preventing return article movement during the return movement of said transfer bar.

5. A conveyor as set forth in claim 4 wherein said means for relatively moving said article supports comprises a flexible connecting member secured to said transfer bar and to each of said article supports and effective to increase the relative spacing between said article supports in response to movement of the transfer bar in one direction, and abutments on the transfer bar and on each of said article supports engageable in response to movement of the transfer bar in the opposite direction to decrease the relative spacing between said article supports.

6. A conveyor as set forth in claim 5 wherein said driving means imparts harmonic accelerating and decelerating motion to said transfer bar during the forward and return movements thereof.

7. A conveyor as set forth in claim 1 wherein one of said expandable and contractable sections is carried by the frame adjacent each end of the transfer bar.

8. A conveyor as set forth in claim 1 wherein said means for varying the relative spacing between said article supports comprises a flexible connecting member secured at one end to said transfer bar, secured at the other end to said frame, and secured at spaced locations intermediate said ends to each of said article supports, said flexible connecting member being effective to increase the relative spacing between said article supports in response to movement of the transfer bar in one direction, and abutment means on the transfer bar and on each of said article supports engageable in response to movement of the transfer bar in the opposite direction to decrease the relative spacing between said article supports.

9. A conveyor as set forth in claim 8 wherein each of said article supports comprises a base plate, an upright member attached to said base plate, said upright member carrying an article supporting member at the level of said article supporting means of the transfer bar, and a pair of guide rails carried by the frame for slidably supporting the base plates of a series of said article supports.

10. A conveyor as set forth in claim 9 wherein said article supporting member and said article supporting means are formed by freely rotatable rollers.

* * * * *